500
United States Patent Office 2,784,190
Patented Mar. 5, 1957

2,784,190
ALKYL PIPERIDINEPROPIONATES

Alan H. Nathan and John A. Hogg, Kalamazoo, Mich., assignors to The Upjohn Company, Kalamazoo, Mich., a corporation of Michigan No Drawing. Application March 28, 1952,
Serial No. 279,206

11 Claims. (Cl. 260—294)

This invention relates to certain piperidinepropionic acid derivatives, and in particular to β-(1-alkyl-4-keto-piperidine-3)-propionic acids and esters thereof.

The novel compounds of the present invention may be represented by the generic formula:

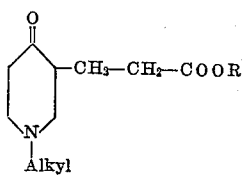

wherein R is selected from the group consisting of hydrogen alkyl radicals, especially lower-alkyl radicals containing up to and including eight carbon atoms, and acid addition and quaternary ammonium salts thereof.

Members of the new class of compounds have been prepared and physical properties thereof determined, whereby they can be identified. The ester bases are high-boiling liquids slightly soluble in water and soluble in diethyl ether, chloroform, benzene, ethyl acetate, and the like. The amino acids are usually crystalline solids. The salts are well-defined crystalline compounds, generally soluble in water and alcohol, and substantially insoluble in ether, benzene, carbon tetrachloride, and ethyl acetate. They generally melt with decomposition, and can be recrystallized from alcohol or a mixture of alcohol and ether. The novel compounds of this invention possess desirable physiological properties including anti-spasmodic activity.

The esters can be prepared by the condensation of an acrylic acid derivative such as, for example, acrylonitrile, acrylic esters, and acrylamide, with a 1-alkyl-3-carbo-alkoxy-4-ketopiperidine in the presence of an alkaline condensing agent to form a substituted piperidine-3-propionic acid derivative, which can be hydrolyzed and decarboxylated under acid conditions to produce a β-(1-alkyl-4-ketopiperidine-3)-propionic acid and then esterified with an appropriate alcohol to form a β-(1-alkyl-4-ketopiperidine-3)-propionic acid ester, as illustrated in the following diagram, wherein R, R', and R'' are alkyl radicals and wherein Y is a carboalkoxy, amide or nitrile radical:

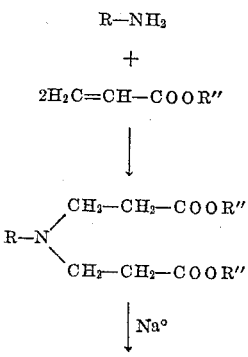

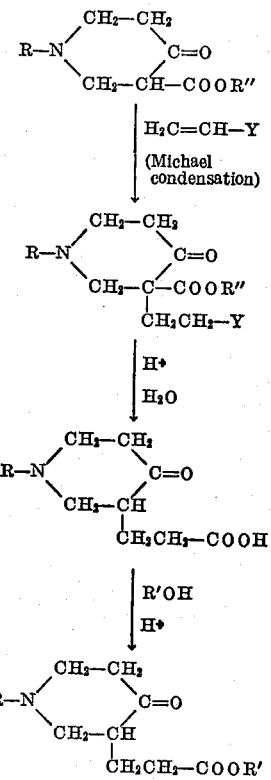

The 1-alkyl-3-carboalkoxypiperidone-4 compounds which are used as starting compounds in the method of the present invention can be prepared by adding an appropriate monoalkyl amine to two molecules of an acrylic ester followed by cyclization with metallic sodium as described by Fuson et al., J. Am. Chem. Soc., 68, 1239 (1946) and Howton, J. Org. Chem., 10, 227 (1945). Various primary alkyl amines such as, for example, methylamine, ethylamine, propylamine, isopropylamine, hexylamine, heptylamine, octylamine, isooctylamine, cyclohexylamine, and the like can be used in the condensation with two moles of an alkyl acrylate. As the carboalkoxy group of the acrylate is subsequently removed, the particular alkyl acrylate employed in the condensation is not critical, although methyl acrylate or ethyl acrylate is preferred.

A 1-alkyl-3-carboalkoxypiperidone-4 will undergo a Michael condensation reaction with acrylonitrile, acrylamide or acrylic esters in the presence of a catalytic amount of an alkaline condensing agent to form a β-(1-alkyl-3-carboalkoxy-4-ketopiperidone-3)-propionic acid derivative. The quantity of alkaline condensing agent used can be varied over a wide range, between about 0.001 and about 0.2 mole of condensing agent per mole of acrylate being preferred.

In the condensation of a carboalkoxypiperidone with an acrylic acid derivative, any acrylic acid derivative which is stable under the reaction conditions is satisfactory, that is, any acrylate in which only the double bond will undergo a chemical change under the conditions of the condensation reaction and, following the method of the present invention, will subsequently hydrolyze to a propionic acid. Among the acrylic acid derivatives which are suitable are acrylonitrile, acrylamide, and alkyl esters of acrylic acid. As the thus-formed propionic acid derivative is hydrolyzed to a free acid in the method of the invention, it is preferred to use acrylonitrile, ethyl acrylate or methyl acrylate for reasons of economy and convenience.

Among the alkaline condensing agents which can be used in the condensation of the present invention are potassium and sodium alkoxides, such as, for example sodium methoxide, sodium ethoxide, potassium isopropoxide, sodium isopropoxide, sodium isooctyloxide, potassium tertiary butoxide, potassium tertiary amyloxide, potassium tertiary octyloxide, et cetera, with potassium tertiary butoxide being preferred; and quaternary ammonium hydroxides such as, for example, benzyltrimethylammonium hydroxide, tetramethylammonium hydroxide, tetraethylammonium hydroxide, benzyldimethylethylammonium hydroxide; and other alkaline condensation catalysts. Suitable solvents are aliphatic alcohols, such as methanol, ethanol, isopropanol, tertiary butanol, ether, benzene, toluene, other hydrocarbon solvents, and the like. When using an alkyl acid as a reactant, it is preferred that the alkyl groups of the alcohol moiety of the ester, the alcohol used as a solvent, and the alkoxide used as a catalyst be the same, or that potassium tertiary butoxide and tertiary butyl alcohol be employed. Since the reaction is exothermic, cooling of the mixture is usually necessary. The resulting propionic acid derivatives can be conveniently isolated by removing the solvent and distilling the residue under reduced pressure.

The propionic acid derivatives thus-prepared can be hydrolyzed and decarboxylated by heating in an aqueous acid solution, the acid being, for example, hydrochloric, sulfuric, et cetera, with hydrochloric acid being preferred, at a temperature above about fifty degrees centigrade, preferably at about 100 degrees centigrade, for a suitable time, usually about twenty hours, the reaction time being somewhat dependent upon the temperature employed. The acid addition salt of the amino acid thus-produced can be recovered by removing the volatile components at reduced pressure. If desired, these acid addition salts can be purified by recrystallization from an appropriate solvent, but it is preferred, as most of the acid addition salts are somewhat hydroscopic, to esterify the carboxylic acid group of the amino acid with an appropriate alcohol to form the corresponding ester without such a recrystallization.

The free acids may be isolated by treatment of the hydrochloride salt with silver oxide, filtering the precipitated silver chloride, and thereafter isolating the amino acid in the usual manner. Alternatively, the free amino acid may be obtained by passing an aqueous solution of a salt of the amino acid through an ion exchange column and thereafter removing the water by distillation at reduced pressure. Amino acids thus-prepared are the $\beta$-(1-alkyl-4-ketopiperidine-3-propionic acids wherein the alkyl group is, for example, methyl, ethyl, propyl, butyl, hexyl, heptyl, octyl, and the like. For example, $\beta$-(1-methyl-4-ketopiperidine-3)-propionic acid is prepared by reacting an alkyl $\beta$-(1-methyl-3-carboalkoxy-4-ketopiperidine-3)-propionate with hydrochloric acid at the reflux point of the reaction mixture. The amino acid is obtained as the hydrochloric acid addition salt. The free amino acid may be isolated according to the procedure described above. The thus-isolated amino acids are usually crystalline solids.

Esterification can be acomplished by any of the usual procedures for preparing esters, for example, heating the amino acid with an alcohol in the presence of an esterification catalyst, a preferred procedure being to reflux a mixture of the amino acid, an appropriate alcohol, and a catalytic amount of a strong acid for about eighteen hours. The amino ester thus formed can be isolated by removing the volatile components under reduced pressure, dissolving the residue in water, adjusting the pH of the aqueous solution to about pH 8 or higher, extracting the free amino ester with a water-immiscible organic solvent, drying and evaporating the solvent, and distilling the amino ester under reduced pressure.

Among the alcohols which can be used to esterify the thus-prepared $\beta$-(1-alkyl-4-ketopiperidine - 3) - propionic acids are methyl, ethyl, propyl, isopropyl, isobutyl, hexyl, heptyl, octyl, cyclohexyl, and cyclopentyl alcohols. If desired, these esters can be converted directly into their acid addition salts, whereafter they then can be purified by recrystallization from a suitable solvent.

Although the invention has been described with particular reference to the free piperidinepropionic acids and acid esters, it is to be understood, however, that the acid addition salts and quaternary ammonium compounds are also included with the scope thereof. Acid addition salts of the piperidinepropionic esters can be prepared in conventional manner from the corresponding amino ester by adding about one chemical equivalent of the selected acid to a solution of the free base in an organic solvent such as, for example, ether, benzene, methanol, hydrocarbon solvents, ethyl acetate, or the like. Quaternary ammonium halides of alkyl $\beta$-(1-alkyl-4-ketopiperidine-3)-propionates, wherein the alkyl groups of the starting alkyl piperidine propionates and products are, as in the acid addition salts, methyl, ethyl, propyl, isopropyl, butyl, hexyl, heptyl, octyl, cyclopentyl, cyclohexyl, or the like, are prepared by mixing the free base and the appropriate alkyl or arylalkyl halide in a solvent such as, for example, benzene, pentane, toluene, ether, or the like, whereupon the quaternary ammonium salt usually separates as a crystalline solid.

Acid addition salts within the scope of the invention include, for example, those formed with hydrochloric, hydrobromic, sulfuric, phosphoric, benzoic, propionic, succinic, citric, picric, and other acids. Representative quaternary ammonium salts are those formed with alkyl and aralkyl halides, such as, for example, methyl chloride, ethyl chloride, benzyl chloride, methyl bromide, ethyl bromide, hexyl bromide, butyl chloride, et cetera, and alkyl iodides, for example, methyl iodide, ethyl iodide, et cetera.

The following examples are illustrative of the processes and products of the present invention but are not to be construed as limiting.

*Example 1.—Methyl $\beta$-(1-methyl-3-carbomethoxy-4-ketopiperidine-3)-propionate*

To a solution of 48.2 grams (0.282 mole) of 1-methyl-3-carbomethoxy-4-ketopiperidine in 180 milliliters of dry ether was added 21 grams (0.244 mole) of methyl acrylate, and 1.56 grams of potassium (0.04 mole) dissolved in 44.5 milliliters of dry tertiary butanol. After cooling the reaction for about fifteen minutes to control the heat of the reaction, the solution was heated under reflux for one hour, an additional 2.9 grams (0.034 mole) of methyl acrylate was added and the heating continued for a total of two hours. Ether, tertiary butanol and other volatile components were removed by distillation at reduced pressure and the residue was dissolved in 250 milliliters of ether. The ether extract was then washed twice with fifty-milliliter portions of water and twice with fifty-milliliter portions of saturated aqueous sodium chloride solution. The combined water washes were then extracted once with 100 milliliters of ether, the ether extracts combined, dried over anhydrous magnesium sulfate, and distilled under reduced pressure of less than one millimeter of mercury absolute to yield 53.5 grams (73.7 percent of the theoretical) of methyl $\beta$-(1-methyl-3-carbomethoxy-4-ketopiperidine - 3) - propionate, which boiled at 119 to 126 degrees centigrade under a pressure of 0.08 millimeter of mercury absolute.

The benzyl ammonium chloride salt was prepared by mixing stoichiometric quantities of benzyl chloride and methyl $\beta$-(1-methyl-3-carbomethoxy-4-ketopiperidine-3)-propionate in ether. Upon recrystallization from a mixture of methanol and ethyl acetate, the salt melted at 150.5 to 151 degrees centigrade.

Analysis.—Calculated for $C_{19}H_{26}ClO_5N$: C, 59.5; H, 6.66; Cl, 9.28; N, 3.65. Found: C, 59.3; H, 6.62; Cl, 9.39; N, 3.89.

In a similar manner, the acid addition salts of methyl β - (1 - methyl - 3 - carbomethoxy - 4 - ketopiperidine-3)-propionate and other alkyl β-(1-alkyl-3-carboalkoxy-4-ketopiperidine-3)-propionates are prepared by reacting the above-named piperidine propionates with the selected acid in a solvent such as, for example, absolute ethyl alcohol, methyl alcohol, ether, benzene, and others.

*Example 2*

In a manner essentially that described in Example 1, the following piperidinepropionates are prepared, using corresponding starting materials:

1. Ethyl β-(1-ethyl-3-carboethoxy-4-ketopiperidine-3)-propionate from ethyl acrylate and 1-ethyl-3-carboethoxy-4-ketopiperidine.
2. Ethyl β-1-n-propyl-3-carbomethoxy-4-ketopiperidine-3)-propionate from ethyl acrylate and 1-n-propyl-3-carbomethoxy-4-ketopiperidine.
3. n-Butyl β-(1-n-octyl-3-carbomethoxy-4-ketopiperidine-3)-propionate from n-butyl acrylate and 1-n-octyl-3-carbomethoxy-4-ketopiperidine.
4. Other alkyl β-(-alkyl-3-carboalkoxy-4-ketopiperidine-3)-propionates from the selected alkyl acrylate and 1-alkyl-3-carboalkoxy-4-ketopiperidine, especially wherein the alkyl groups are lower-aliphatic.

*Example 3.* — β-(*1-methyl-3-carbomethoxy-4-ketopiperidine-3*)-*propionitrile*

To a mixture of 30.8 grams (0.18 mole) of 1-methyl-3-carbomethoxy-4-ketopiperidine, 55 milliliters of tertiary butanol and six grams of a forty percent solution of benzyltrimethylammonium hydroxide in water was added ten grams (0.19 mole) of acrylonitrile at a uniform rate over a period of about thirty minutes. The reaction temperature was maintained at 35 to 41 degrees centigrade by intermittent cooling of the reaction flask. After all of the acrylonitrile had been added, the reaction mixture was stirred for an additional two and one-half hours and the volatile components thereafter removed by heating under reduced pressure. The resulting viscous residue was mixed with 150 milliliters of water and extracted with ether in a continuous extractor. The ether extract was then fractionally distilled to yield 17.4 grams (41 percent of theory) of β-(1-methyl-3-carbomethoxy-4-ketopiperidine-3)-propionitrile.

β - ( - 1 - methyl - 3 - carbomethoxy - 4 - ketopiperidine-3)-propionitrile picrate was prepared in a quantitative yield by mixing molar equivalents of picric acid and the amine in ethanol. Upon recrystallization from 3A denatured alcohol, the picrate melted at 148 to 149 degrees centigrade and analyzed as follows:

Analysis.—Calculated for $C_{17}H_{19}N_5O_{10}$: C, 45.0; H, 4.23; N, 15.4. Found: C, 45.2; H, 4.17; N, 14.9.

In a similar manner, other acid addition salts of β-(1-methyl - 3 - carbomethoxy - 4 - ketopiperidine - 3) - propionitrile and other β-(1-alkyl-3-carboalkoxy-4-ketopiperidine-3)-propionitriles are prepared by reacting the above-named piperidinepropionitriles with the selected acid in a solvent such as, for example, absolute ethyl alcohol, methyl alcohol, ether, benzene, and others.

*Example 4*

In a manner essentially that described in Example 3, the following piperidine-3-propionic acid derivatives are prepared using corresponding starting materials:

1. β-(1 - isopropyl - 3 - carboethoxy - 4 - ketopiperidine-3)-propionitrile from acrylonitrile and 1-isopropyl-3-carboethoxy-4-ketopiperidine.
2. β - (1 - isoamyl - 3 - carbomethoxy - 4 - ketopiperidine-3)-propionamide from acrylamide and 1-isoamyl-3-carbomethoxy-4-ketopiperidine.
3. Other β-(1-alkyl-3-carboalkoxy-4-ketopiperidine-3)-propionitriles from acrylonitrile and the selected 1-alkyl-3-carboalkoxy-4-ketopiperidine, especially wherein the alkyl groups are lower-aliphatic.

*Example 5.—Ethyl β-(1-methyl-4-ketopiperidine-3)-propionate*

A solution of 19.5 grams (0.087 mole) of β-(1-methyl-3-carbomethoxy-4-ketopiperidine-3)-propionitrile in fifty milliliters of twenty percent aqueous hydrochloric acid was heated under reflux for seventeen hours and the volatile components thereafter removed at reduced pressure. The semi-solid residue was agitated with 75 milliliters of 3A denatured alcohol, filtered to remove the ammonium chloride, and the alcohol removed by distillation at reduced pressure. After two more similar extractions, filtrations, and separation of alcohol, using fifty and seventy milliliter portions of alcohol, the β-(1-methyl-4-ketopiperidine -3)-propionic acid hydrochloride residue was dissolved in a mixture of thirty milliliters of absolute ethanol, fifty milliliters of ethylene chloride, and 0.15 milliliter of concentrated hydrochloric acid and refluxed for twenty hours. The reaction mixture was diluted with 100 milliliters of water and the aqueous phase separated, saturated with solid sodium bicarbonate and continuously extracted with ether for two hours. After removal of the ether by distillation at reduced pressure, the residue was distilled at a pressure of less than one millimeter of mercury absolute to yield 14.3 grams (77 percent of the theoretical) of ethyl β-(1-methyl-4-ketopiperidine-3)-propionate, which boiled at 98 to 120 degrees centigrade at a pressure varying between 0.1 and 0.08 millimeter of mercury.

The picrate of this ester was prepared by mixing an alcoholic solution of the amino ester with one molar equivalent of picric acid and found to melt at 122.5 to 123 degrees centigrade.

In a similar manner, other acid addition salts of ethyl β - (1 - methyl - 4 - ketopiperidine - 3) - propionate and other alkyl β-(1-alkyl-4-ketopiperidine-3)-propionates are prepared wherein the alkyl groups of the starting alkyl piperidinepropionates and products are methyl, ethyl, propyl, isopropyl, butyl, hexyl, heptyl, octyl, or the like, by reacting the selected alkyl piperidinepropionate with about a stoichiometric amount of an acid such as, for example, tartaric, citric, hydrochloric, sulfuric, nitric, phosphoric, succinic, lactic, and others, in a solvent such as, for example, benzene, ether, ethyl alcohol, methyl alcohol, isopropyl alcohol, and others, and thereafter separating the thus-produced acid addition salt by removal of the solvent by distillation, or filtration of the precipitated acid addition salt. Compounds thus-prepared include ethyl β-(1-methyl-4-ketopiperidine-3)-propionate hydrochloride, ethyl β-(1-ethyl-4-ketopiperidine-3)-propionate hydrochloride, the corresponding hydrobromides, and others. The recovered acid addition salts may be crystallized from a suitable solvent in the usual manner.

*Example 6*

In a manner similar to that of Example 5, a solution of 60.1 grams of ethyl β-(1-methyl-3-carbomethoxy-4-ketopiperidine-3)-propionate in 150 milliliters of twenty percent aqueous hydrochloric acid was heated under reflux for seventeen hours and the volatile components removed by distillation at reduced pressure. The residue was dissolved in seventy milliliters of 3A denatured alcohol, filtered, and evaporated to dryness. After a similar treatment with seventy milliliters of absolute ethanol, the β-(1-methyl-4-ketopiperidine-3)-propionic acid hydrochloride residue was dissolved in a mixture of eighty milliliters of absolute ethanol, 140 milliliters of ethylene dichloride and 0.38 milliliter of concentrated sulfuric acid and the solution heated under reflux for eighteen hours. Volatile components were then removed by distillation on a steam bath, an additional fifty milliliters of ethylene dichloride was added, and the solvent thereafter removed by distillation. The residual amino ester hydrochloride was dissolved in 100 milliliters of water, the resulting aqueous solution extracted once with an equal volume of ethylene chloride, saturated with added solid sodium bicarbonate, and extracted with four fifty-milliliter portions of ether. The ether extracts were combined, dried over anhydrous magnesium sulfate, and evaporated. The viscous residue was then distilled under a reduced pressure of less than one millimeter of mercury absolute to yield 35.7 grams (71.5 percent of theory) of ethyl β-(1-methyl-4-ketopiperidine-3)-propionate, which distilled at 105 to 114 degrees centigrade at a pressure of 0.3 millimeter of mercury absolute.

*Example 7*

In a manner essentially that described in Examples 5 and 6, the following amino esters are prepared from corresponding starting materials:

1. Methyl β-(1-ethyl-4-ketopiperidine-3)-propionate is prepared by the hydrolysis and decarboxylation of ethyl β-(1-ethyl-3-carbomethoxy-4-ketopiperidine-3)-propionate with dilute hydrochloric acid and thereafter esterifying the thus-produced β-(1-ethyl-4-ketopiperidine-3)-propionic acid with methyl alcohol in the presence of an esterification catalyst.

2. Methyl β-(1-methyl-4-ketopiperidine-3) - propionate is prepared by the hydrolysis and decarboxylation of ethyl β - (1-methyl-3-carbomethoxy-4-ketopiperidine-3)-propionate with dilute hydrochloric acid and thereafter esterifying the thus-produced β-(1-methyl-4-ketopiperidine-3)-propionic acid with methyl alcohol in the presence of an esterification catalyst.

3. Ethyl β-(1-ethyl - 4 - ketopiperidine-3)-propionate is prepared by the hydrolysis and decarboxylation of ethyl β-(1-ethyl-3-carbomethoxy-4-ketopiperidine - 3) - propionate with dilute hydrochloric acid and thereafter esterifying the thus-produced β-(1-ethyl-4-ketopiperidine-3)-propionic acid with ethyl alcohol in the presence of an esterification catalyst.

4. n-Amyl β-(1-isoamyl-4-ketopiperidine-3)-propionate is prepared by the hydrolysis and decarboxylation of methyl β-(1-isoamyl-3-carboethoxy-4 - ketopiperidine - 3-propionate with dilute hydrochloric acid and thereafter esterifying the thus-produced β-(1-isoamyl-4-ketopiperidine-3)-propionic acid with amyl alcohol in the presence of an esterification catalyst.

5. Other alkyl β-(1-alkyl-4-ketopiperidine-3)-propionates, especially such compounds wherein the alkyl groups are methyl, ethyl, propyl, isopropyl, butyl, isobutyl, hexyl, heptyl, octyl, or the like, are prepared by the hydrolysis and decarboxylation of alkyl β-(1-alkyl-3-carboalkoxy-4-ketopiperidine-3)-propionates with a mineral acid and thereafter esterifying the thus-produced β-(1-alkyl-4-ketopiperidine-3)-propionic acid with an alkanol in the presence of an esterification catalyst.

The corresponding amino acids and amino acid hydrochlorides can be isolated prior to esterification by crystallization of the hydrolysis residue, thereby obtaining a pure amino acid hydrochloride which may be converted to the free amino acid according to the procedure given previously.

*Example 8.—Ethyl β-(1-methyl-4-ketopiperidine-3)-propionate methiodide*

Ethyl β-(1-methyl-4-ketopiperidine-3)-propionate methiodide was prepared by reacting equimolar amounts of ethyl iodide and ethyl β-(1-methyl-4-ketopiperidine-3-propionate at room temperature in diethyl ether. Recrystallization of the quaternary ammonium salt from 3A denatured alcohol gave ethyl β-(1-methyl-4-ketopiperidine-3)-propionate methiodide, which melted at 160 to 162.5 degrees centigrade.

*Analysis.*—Calculated for $C_{12}H_{22}INO_3$: I, 35.7. Found: I, 35.7.

In a similar manner, other quaternary ammonium salts of ethyl β-(1-methyl-4-ketopiperidine-3)-propionates and other alkyl β-(1-alkyl-4-ketopiperidine-3)-propionates are prepared, wherein the alkyl groups of the starting alkyl piperidinepropionates and products are methyl, ethyl, propyl, isopropyl, butyl, hexyl, heptyl, octyl, or the like, by reacting the selected alkyl piperidinepropionate with an alkyl halide or arylalkyl halide such as, for example, methyl, ethyl, propyl, isopropyl, butyl, hexyl, heptyl, octyl, benzyl, cyclopentyl, cyclohexyl chlorides, bromides, or iodides, and others. Compounds thus-prepared include ethyl β-(1-methyl-4-ketopiperidine-3)-propionate methiodide, methobromide, and methochloride, ethyl β-(1-ethyl-4-ketopiperidine-3)-propionate methiodide, methobromide and methochloride and the like.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A process for the production of an alkyl β-(1-alkyl-4-ketopiperidine-3)-propionate which includes: condensing a compound selected from the group consisting of alkyl esters of acrylic acid, acrylonitrile, and acrylamide with a 1-alkyl-3-carboalkoxy-4-ketopiperidine in the presence of an alkaline condensation catalyst, reacting the thus-produced condensation product with an aqueous mineral acid to produce a β-(1-alkyl-4-ketopiperidine-3)-propionic acid; and thereafter reacting the thus-produced β-(1-alkyl-4-ketopiperidine-3)-propionic acid with an alkanol in the presence of an esterification catalyst to produce an alkyl β-(1-alkyl-4-ketopiperidine-3)-propionate.

2. A process for the production of an alkyl β-(1-methyl-4-ketopiperidine-3)-propionate which comprises: condensing an alkyl ester of acrylic acid with a 1-ethyl-3-carboalkoxy-4-ketopiperidine in the presence of an alkaline condensation catalyst to produce an alkyl β-(1-methyl - 3 - carboalkoxy - 4 - ketopiperidine - 3) - propionate, reacting the thus-produced alkyl β-(1-methyl-3-carboalkoxy-4-ketopiperidine-3)-propionate with an aqueous mineral acid to produce β-(1-methyl-4-ketopiperidine-3)-propionic acid, and reacting the thus-produced β-(-methyl-4-ketopiperidine-3)-propionic acid with an alkanol in the presence of an esterification catalyst to produce an alkyl β-(1-methyl-4-ketopiperidine-3)-propionic acid.

3. A process for the production of an alkyl β-(1-ethyl-4-ketopiperidine-3)-propionate which comprises: condensing an alkyl ester of acrylic acid with a 1-ethyl-3-carboalkoxy-4-ketopiperidine in the presence of an alkaline condensation catalyst to produce an alkyl β-(1-ethyl-3-carboalkoxy-4-ketopiperidine-3) - propionate, reacting the thus-produced alkyl β-(1-ethyl-3-carboalkoxy-4-ketopiperidine-3)-propionate with an aqueous mineral acid to produce β-(1-ethyl-4-ketopiperidine-3)-propionic acid, and reacting the thus-produced β-(1-ethyl-4-ketopiperidine-3)-propionic acid with an alkanol in the presence of an esterification catalyst to produce an alkyl β-(1-ethyl-4-ketopiperidine-3)-propionate.

4. A process for the production of ethyl β-(1-methyl-4-ketopiperidine-3)-propionate which comprises: condensing ethyl acrylate with a 1-methyl-3-carboalkoxy-4-ketopiperidine in the presence of an alkaline condensation catalyst to produce ethyl β-(1-methyl-3-carboalkoxy-4-ketopiperidine-3)-propionate, reacting the thus-produced ethyl β-(1-methyl-3-carboalkoxy-4-ketopiperidine-3)-propionate with hydrochloric acid to produce β-(1-methyl-4-ketopiperidine-3)-propionic acid, and reacting the thus-produced β-(1-methyl-4-ketopiperidine-3)-propionic acid with ethyl alcohol in the presence of an esterification catalyst to produce ethyl β-(1-methyl-4-ketopiperidine-3)-propionate.

5. A process for the production of a β-(1-alkyl-4-ketopiperidine-3)-propionic acid which comprises: reacting a compound selected from the group consisting of alkyl β-(1-alkyl-3-carboalkoxy-4-ketopiperidine-3)-propionates, β-(1-alkyl-3-carboalkoxy-4-ketopiperidine-3)-propionitriles, and β-(1-alkyl-3-carboalkoxy-4-ketopiperidine-3)-propionamides, with a mineral acid at a temperature between about fifty degrees centigrade and about 200 degrees centigrade to produce a β-(1-alkyl-4-ketopiperidine-3)-propionic acid.

6. A process for the hydrolysis and decarboxylation of an alkyl β-(1-alkyl-3-carboalkoxy-4-ketopiperidine-3)-propionate to produce a β-(1-alkyl-4-ketopiperidine-3)-propionic acid which comprises: reacting an alkyl β-(1-alkyl-3-carboalkoxy-4-ketopiperidine-3)-propionate with a mineral acid at a temperature between about fifty degrees centigrade and about 200 degrees centigrade to produce a β-(1-alkyl-4-ketopiperidine-3)-propionic acid.

7. A process for the production of a β-(1-alkyl-4-ketopiperidine-3)-propionic acid ester which comprises: reacting an alkyl β-(1-alkyl-3-carboalkoxy-4-ketopiperidine-3)-propionate with a mineral acid at a temperature between about fifty degrees centigrade and about 200 degrees centigrade to produce a β-(1-alkyl-4-ketopiperidine-3)-propionic acid and thereafter reacting the thus-produced β-(1-alkyl-4-ketopiperidine-3)-propionic acid with an alcohol in the presence of an esterification catalyst to produce an alkyl β-(1-alkyl-4-ketopiperidine-3)-propionate.

8. A process for the production of an alkyl β-(1-methyl-4-ketopiperidine-3)-propionate which comprises: reacting an alkyl β-(1-methyl-3-carboalkoxy-4-ketopiperidine-3)-propionate with an aqueous mineral acid at a temperature between about fifty degrees centigrade and about 200 degrees centigrade to produce β-(1-methyl-4-ketopiperidine-3)-propionic acid and thereafter reacting the thus-produced β-(1-methyl-4-ketopiperidine-3)-propionic acid with an alkanol in the presence of an esterification catalyst to produce an alkyl β-(1-methyl-4-ketopiperidine-3)-propionate.

9. A process for the production of an alkyl β-(1-ethyl-4-ketopiperidine-3)-propionate which comprises: reacting an alkyl β-(1-ethyl-3-carboalkoxy-4-ketopiperidine-3)-propionate with an aqueous mineral acid at a temperature between about fifty degrees centigrade and about 200 degrees centigrade to produce β-(1-ethyl-4-ketopiperidine-3)-propionic acid and thereafter reacting the thus-produced β-(1-ethyl-4-ketopiperidine-3)-propionic acid with an alkanol in the presence of an esterification catalyst to produce an alkyl β-(1-ethyl-4-ketopiperidine-3)-propionate.

10. A process for the production of ethyl β-(1-methyl-4-ketopiperidine-3)-propionate which comprises: reacting an alkyl β-(1-methyl-3-carboalkoxy-4-ketopiperidine-3)-propionate with hydrochloric acid at a temperature between about fifty degrees centigrade and about 200 degrees centigrade to produce β-(1-methyl-4-ketopiperidine-3)-propionic acid and reacting the thus-produced β-(1-methyl-4-ketopiperidine-3)-propionic acid with ethanol in the presence of an esterification catalyst to produce ethyl β-(1-methyl-4-ketopiperidine-3)-propionate.

11. A process for the production of a β-(1-alkyl-4-ketopiperidine-3)-propionic acid which comprises: condensing a compound selected from the group consisting of alkyl esters of acrylic acid, acrylonitrile, and acrylamide with a 1-alkyl-3-carboalkoxy-4-ketopiperidine in the presence of an alkaline condensation catalyst, and reacting the thus-produced condensation product with an aqueous mineral acid to produce a β-(1-alkyl-4-ketopiperidine-3)-propionic acid.

References Cited in the file of this patent

UNITED STATES PATENTS

| 2,329,432 | Bruson | Sept. 14, 1943 |
| 2,386,737 | Bruson | Oct. 9, 1945 |
| 2,403,570 | Wiest et al. | July 9, 1946 |

OTHER REFERENCES

McElvain et al.: JACS, vol. 68, p. 1049 (1946).